United States Patent [19]

Verhoeven

[11] 4,394,684

[45] Jul. 19, 1983

[54] DEVICE FOR DIFFERENTIAL IMAGE DETERMINATION

[75] Inventor: Leonardus A. J. Verhoeven, Eindhoven, Netherlands

[73] Assignee: U.S. Philips Corporation, New York, N.Y.

[21] Appl. No.: 342,330

[22] Filed: Jan. 25, 1982

Related U.S. Application Data

[63] Continuation-in-part of Ser. No. 165,174, Jul. 2, 1980, Pat. No. 4,350,998.

[30] Foreign Application Priority Data

Jul. 19, 1979 [NL] Netherlands ......................... 7905611

[51] Int. Cl.³ ............................................. H04N 7/18
[52] U.S. Cl. .................................... 358/111; 358/138; 358/166; 364/724
[58] Field of Search ............... 358/111, 135, 138, 160, 358/166; 364/515, 724, 414

[56] References Cited

U.S. PATENT DOCUMENTS 4,149,259  4/1979  Kowalski ........................... 364/724
4,228,465  10/1980  Stone ..................................... 358/111
4,350,998  9/1982  Verhoeven ......................... 364/724

OTHER PUBLICATIONS

Optical Engineering, vol. 17, No. 6, Nov.-Dec. 1978, pp. 652–657, R. A. Kruger et al., "A Digital Video Image Processor for Real–Time X–Ray Subtraction Imaging".

Primary Examiner—Howard Britton
Attorney, Agent, or Firm—Jack E. Haken

[57] ABSTRACT

Two image processing devices having different time delays are used to generate time difference images having high signal-to-noise ratios. The image processing devices may be real time image processors having only one image memory wherein consecutive images are sequentially fed in digital form to a recursive filter. In such devices the memory is employed in the recursive filter as a "delay element", as a result of which noise integration and differential image determination between consecutive images takes place.

3 Claims, 4 Drawing Figures

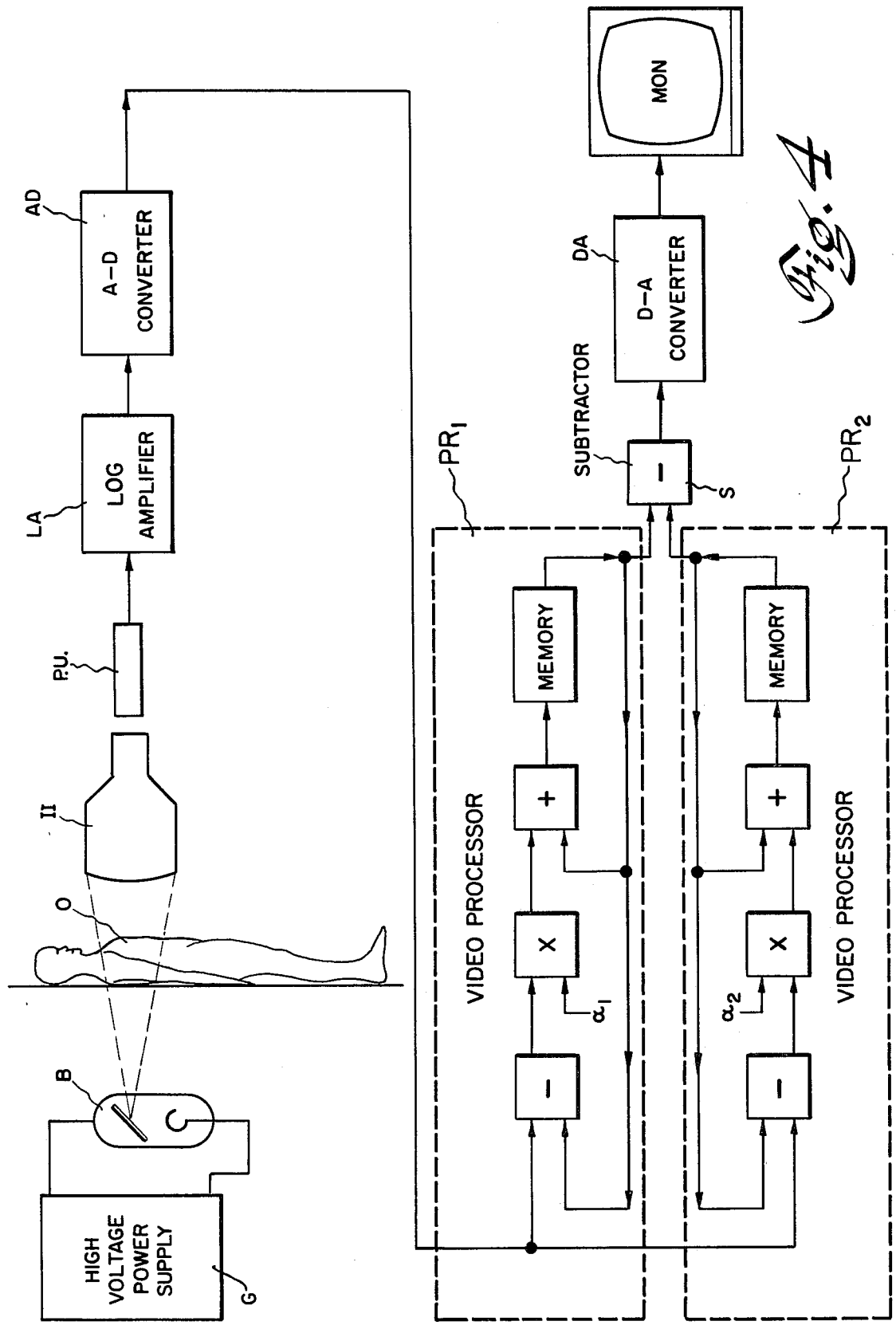

DEVICE FOR DIFFERENTIAL IMAGE DETERMINATION

RELATED APPLICATIONS

This application is a continuation-in-part of application Ser. No. 165,174 filed July 2, 1980, now U.S. Pat. No. 4,350,998.

BACKGROUND OF THE INVENTION

The invention relates to a device for processing images with an image forming set-up for producing images which are split up into elements, a memory for the storage of image information by elements, a subtraction circuit for the subtraction of image information from each image element of previously determined image information in the corresponding image element and a playback device for reproducing the information determined via the subtraction circuit from each image element.

Such a medical examination device has already been proposed in a paper by R. A. Kruger et al. published in the bimonthly journal "Optical Engineering", Vol. 17, No. 6, November/December 1978, pp. 652-657. In the examination device a fluoroscopic image is converted via an image intensifier and image pick-up chain into a video-signal which is then digitized. The digitized image is then stored in one of three video-memories. Each video-memory must have the capacity to hold summed image information emanating from a number of fluoroscopic images. The function of the three video-memories changes cyclically. A weighted image is determined from two memories which reproduces, with emphasis, the differences between the consecutive images stored in the two memories. An image information processing method such as this is termed time-interval differential imaging by the authors of the paper. The third memory is regenerated while the differences in the two memories are being determined. For this reason the device described in the paper must contain three video-memories. This makes it expensive.

SUMMARY OF THE INVENTION

The aim of the invention is to provide an examination device which is considerably cheaper but capable of processing the same image information.

The examination device according to the invention is characterized in that at least the subtraction circuit, the memory, a multiplication circuit and an addition circuit form a recursive filter. The addition circuit has a first input for receiving elements of image information from an image producer and a second input for receiving previously determined image information which is stored in the memory. To this end an output of the memory is connected to the second input of the addition circuit in such a way that a signal is fed to an input of the memory, which signal is the sum of the information originating from the image multiplied by a factor ($\alpha$) and the information originating from the memory multiplied by $(1-\alpha)$ (in which $0 \leq \alpha \leq 1$). The subtraction circuit is connected on the one hand to the output of the memory, and, on the other hand, to the input of the recursive filter. Only one memory space is required for a video-image because the invention uses the video-memory as part of a recursive filter. This represents a saving and is therefore of advantage.

A preferred design of an examination device in accordance with the invention is characterized by the fact that the recursive filter contains one multiplication circuit having an input is connected to an input of the subtraction circuit which in turn has an input coupled to an input of the addition circuit. An output of the addition circuit is then connected to an input of the memory and a further input of the addition circuit is connected to the output of the memory. This preferred design has the advantage that the processing of the video-information can be matched to different examination situations with only one parameter (the multiplication factor of the only multiplier); it is therefore very flexible.

It should be noted that, in the publication mentioned, an addition circuit is also provided for each video-memory, to which the output of the video-memory is fed back. The purpose of the feedback is, however, to sum image information for each image element from different sequential video-images with the object of improving the signal-to-noise ratio. In the present invention the addition circuit in the examination device forms part of the recursive filter and thus has a different function.

DESCRIPTION OF THE DRAWINGS

The invention will be explained on the basis of an example given in diagrammatic form in which:

FIG. 4 is an alternate embodiment of the invention which produces smooth sequences of images having improved signal-to-noise ratios.

DESCRIPTION OF THE PREFERRED EMBODIMENTS

Figure 1:
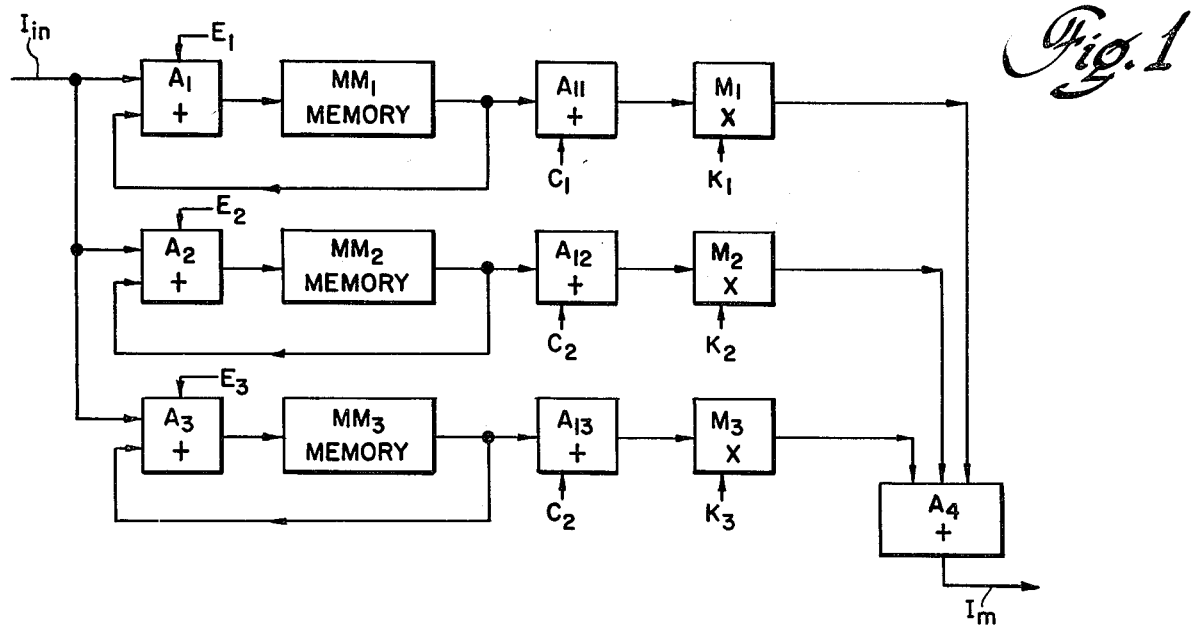
FIG. 1 shows in a block diagram how image information is processed in accordance with the prior art.

FIG. 1 shows a block diagram of an image processing device designed according to the prior art; use is made of three parallel-connected memory chains. Each chain comprises a primary adder $A_1$, $A_2$, $A_3$, a memory $MM_1$, $MM_2$, and $MM_3$, a constant adder $A_{11}$, $A_{12}$, and $A_{13}$; and a multiplier $M_1$, $M_2$ and $M_3$. The outputs of the three multipliers are connected to a summing device $A_4$. In the three memories $MM_1$, $MM_2$ and $MM_3$, sequentially digitized X-ray images are stored. Thus it is possible to sum a number of directly consecutive X-ray images in each memory. For this purpose, one output from each memory is connected in feedback to the primary adder. The purpose of the feedback is to improve the signal-to-noise ratio of the stored image information. The particular memory chain to which the digitized information $I_{in}$ is fed depends on the signal inputs $E_1$, $E_2$ and $E_3$ which act to block inputs of the primary adders.

The output of each memory (e.g. a random access memory (RAM)) is connected to a constant adder $A_{11}$, $A_{12}$ or $A_{13}$ through which an arbitrary constant may be combined with the information obtained from that memory. The sum of the memory content $I_i$ and the added constant $E_i$ is then fed to the multiplier in which a product is formed with a freely chosen constant factor $K_i$. The products formed in the multipliers are fed to the summing device $A_4$. The output $I_m$ of the summing device $A_4$ then feeds the value $$I_m = \sum_{i=1}^{3} K_i(I_i + C_i)$$

With above-described procedure it is possible, for example, to generate time-dependent differential X-ray images with e.g. the difference being reproduced between the X-ray images ($K_1 = -1$; $K_2 = +1$; $K_3 = 0$; $C_1 = C_2 = 0$) stored in the memories $MM_1$ and $MM_2$ while a third X-ray image is read into memory $MM_3$. A disadvantage of the set-up described for this purpose is that it requires multiple memory spaces.

Figure 2:
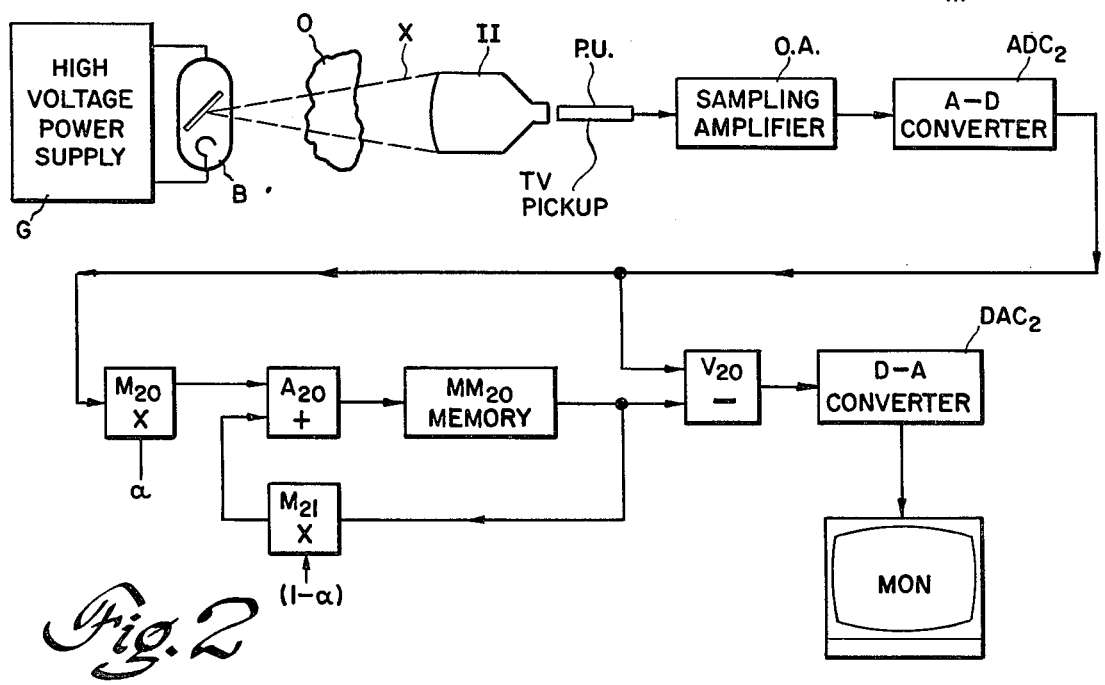
FIG. 2 shows an examination device designed in accordance with the invention.

The examination device of FIG. 2 has the advantage that only one memory space $MM_{20}$ is needed (the memory capacity of $MM_{20}$ is equal to that of the separate memories $MM_1$, $MM_2$ or $MM_3$). The examination device shown in FIG. 2 contains high voltage source G for supplying the X-ray tube B. An object O is irradiated with the radiation X generated by the X-ray tube B, and a shadow image of object O is formed on teh input screen of the image intensifier II. The shadow image, intensified and reduced in size, is converted into an analog video signal via a camera tube PU connected to the output screen of the image intensifier II. An amplifier OA with a sampling circuit intensifies and samples this video-signal; subsequently the sampled signal is converted into digital form via an analog-digital converter $ADC_2$.

The digitized signal is fed to an image information processor comprising the following component parts: multipliers $M_{20}$ and $M_{21}$, an adder $A_{20}$, a memory $MM_{20}$ and a subtraction circuit $V_{20}$. Furthermore, the examination device shown in FIG. 2 contains a digital-analog converter $DAC_2$ and a display device (e.g. a TV monitor) MON. The examination device can, of course, also contain a magnetic tape recorder, a recorder for video or digital signals or a copier/printer for the more permanent registration of the processed X-ray images.

The image information processing part forms a recursive filter and works as follows: for each element a value originating from the analog-digital converter ADC2 is fed to the multiplier $M_{20}$; there the value is multiplied by the value $\alpha(0 \leq \alpha \leq 1)$ which has likewise been fed to the multiplier $M_{20}$. The product is fed to the adder $A_{20}$ to which the value from the same image element already stored in the memory $MM_{20}$ multiplied by a factor $(1-\alpha)$ is also fed. The multiplication is performed by a multiplier $M_{21}$ which links the output of the memory $MM_{20}$ with an output of the adder $A_{20}$. The sum of the two values fed to the adder $A_{20}$ is stored at the address of the image element. The value originating from the analog-digital converter ADC2 and also the value stored in the memory $MM_{20}$ are fed to the subtraction circuit $V_{20}$, so that the difference between the two values is fed to the digital-analog converter $DAC_2$ and displayed on the monitor MON.

Figure 3:
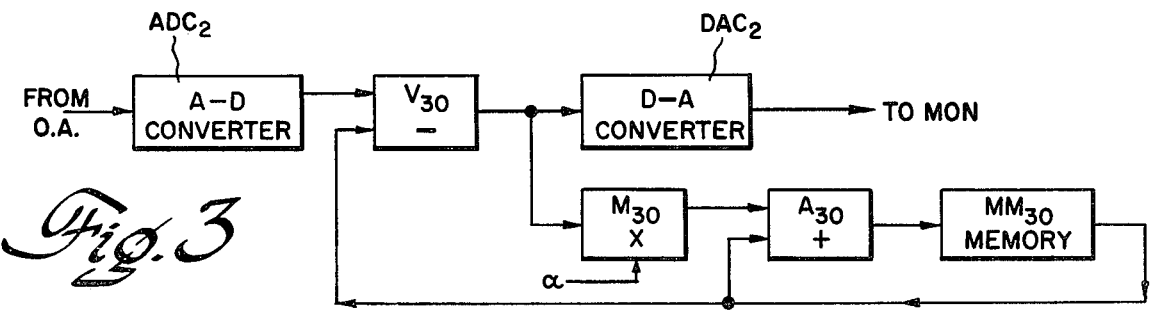
FIG. 3 shows a preferred design of the image information processing section of an examination device designed in accordance with the invention.

FIG. 3 shows a preferred design of an information processing component; for the sake of clarity an input of the analog-digital converter ADC2 and an output of the digital-analog converter DAC2 from FIG. 2 are shown. The processing component contains only a subtraction circuit $V_{30}$, a multiplier $M_{30}$, an adder $A_{30}$ and a memory $MM_{30}$. The subtraction circuit $V_{30}$ is interposed between the analog-digital converter ADC2 and the digital-analog converter DAC2. The output of the subtraction circuit $V_{30}$ is also connected to the multiplier $M_{30}$ at which a freely selected factor $(0 \leq \alpha \leq 1)$ is multiplied with an output signal of the multiplier circuit $M_{30}$.

The product of this circuit is fed to the adder $A_{30}$ as is also a value requested at the output of the memory $MM_{30}$. The requested value is also fed to the subtraction circuit $V_{30}$. A sum generated by the adder $A_{30}$ is again fed to the memory $MM_{30}$. The image information processing parts shown in FIG. 2 and FIG. 3 both have the same filter behaviour.

Information processing according to the preferred design example shown in FIG. 3 is very flexible, as the information processing can be adapted to different examination situations (e.g. to the flow-rate of a contrast medium) by changing only one parameter ($\alpha$). By making a correct choice of ($\alpha$) the same delay occurs as with image information processing according to FIG. 1.

The examples shown in FIGS. 2 and 3 are based on digital technique. If analog memories, such as charge-coupled information carriers, are employed for the memories $MM_{20}$, $_{30}$, the information processing can be performed with full analog technique, so that operational amplifiers can be used for the subtraction circuits $V_{22}$, $V_{30}$, the adder $A_{20}$, $A_{30}$, and the multipliers $M_{20}$, $Ms_{21}$ and $M_{30}$. If charge-coupled information carriers are used as video-memories and similar techniques are employed for picking up and converting the X-ray image generated on the output screen of the image intensifier into a "video-signal" (instead of a camera tube), it will be found advantageous to synchronize the "reading out" of the image pick-up of the image intensifier and the "shifting" of the charge in the video-memory of the recursive filter.

FIG. 4 is an imaging system which combines two video processors of the type previously described with reference to FIG. 3 to produce a smooth sequence of images having very high signal-to-noise ratios. The system is particularly useful for examining the dynamic properties of the heart, such as wall motion studies. Ventriculography of the heart may be performed by time interval difference (TID) imaging at a rate of 50 field/second after intravenous injection of a contrast medium.

X-rays are generated by a high voltage power supply G which may for example be a 200 KW angio-generator, in conjunction with an X-ray tube B, which may be a 0.3/0.7 mm focus X-ray tube using the larger of the focal spots. The X-rays pass through the heart of a patient 0 and are imaged by an X-ray image intensifier II, which may be a 14 inch image intensifier having a fiber optic output window. Images are transferred from the output window of the X-ray image intensifier II to a television pick-up PU. The signal from the television pick-up is logarithmically amplified in amplifier LA and is digitized in an analog-to-digital converter AD. The output of the analog-to-digital converter is fed to the inputs of two parallel video processor chains $PR_1$ and $PR_2$ of the type previously described with respect to FIG. 3. The outputs of the video processors are combined in a subtractor S whose output is converted to an analog signal in digital-to-analog converter DA and is displayed on a monitor MON. Each video processor noise-integrates the signal from the analog-to-digital converter and also introduces some delay into its signal path, the delay being dependent on the multiplying factor used in the processor. The constant $\alpha_1$ is utilized as the multiplying factor in the video processor $PR_1$ while the constant $\alpha_2$ is utilized as the multiplying factor in the video processor $PR_2$. If the multiplying factors $\alpha_1$ and $\alpha_2$ are equal the output of the subtractor S will always be zero. If, however, different multiplying factors are applied in the two processors, a moving image signal from the pick-up will produce finite difference signal at the output of the subtractor. New images are produced at a very high rate and the displayed images have very high signal to noise ratios since all video information is utilized; that is: no video fields are skipped. If TV images of the heart are acquired at a rate of 50 per second at a dose of 15 ur/field in a 10 inch mode, it appears that heart motion becomes visible without use of a contrast medium.

In a preferred embodiment of the invention the ratio of $\alpha_1$ to $\alpha_2$ is a power of two (i.e. 2, 4, 8 or 16). The differential multiplication between processors $PR_1$ and $PR_2$ can then be implemented as a shift of one or more binary digits of the encoded picture information.

Besides being employed for X-ray examination devices the image information processing unit can also be used in other examination devices employing other penetrating radiations such as infra-red, nuclear and/or ultrasonic radiation. The image information processing unit can also be used in a closed circuit TV system for observation or security purposes, since a change in the image information will be displayed in emphasized form on the monitor.

I claim:

1. A device for processing current image information which has been separated into image elements comprising:

first video processor means comprising a first memory, multiplying and addition circuits connected at least with the first memory to form recursive filter means which functions to multiply the current image information by a factor $\alpha_1$, to multiply image information received from an output of the first memory by a factor $(1-\alpha_1)$, with $0 \leq \alpha_1 \leq 1$, to add the resulting products on an elemental basis and to supply the resulting sum to an input of the first memory;

second video processor means comprising a second memory, multiplying and addition circuits connected at least with the second memory to form a recursive filter which functions to multiply the current image information by a factor $\alpha_2$, to multiply image information received from an output of the second memory by a factor $(1-\alpha_2)$, with $0 \leq \alpha_2 \leq 1$, to add the resulting products on an elemental basis and to supply the resulting sum to an input of the second memory;

subtraction means connected to outputs of the first memory and the second memory which function to subtract image information in the first memory from image information in the second memory, the factor $\alpha_1$ being different from the factor $\alpha_2$.

2. The device of claim 1 wherein each of the video processors comprise digital circuits and wherein the ratio of the factor $\alpha_1$ to the factor $\alpha_2$ is a power of 2.

3. The device of claim 1 or 2 wherein:

the first video processor means comprises a first subtractor, a first multiplier, a first adder, and the first memory, the first subtractor being connected to subtract the output of the first memory from the current image information and to supply the difference therebetween to an input of the first multiplier, the first multiplier being connected to multiply the output of the first subtractor by the factor $\alpha_1$ and to supply the product thereof to an input of the first adder, the first adder being connected to add the output of the first memory to the output of the first multiplier and to supply the sum thereof to the input of the first memory; and Wherein the second video processor comprises a second subtractor, a second multiplier, a second adder, and the second memory; the second subtractor being connected to subtract the output of the second memory from the current image information and to supply the difference therebetween to an input of the second multiplier, the second multiplier being connected to multiply the output of the second subtractor by the factor $\alpha_2$ and to supply the product thereof to an input of the second adder, the second adder being connected to add the output of the second memory to the output of the second multiplier and to supply the sum thereof to the input of the second memory.

* * * * *